United States Patent
Fickle et al.

[11] 3,828,532
[45] Aug. 13, 1974

[54] HARVESTING MACHINE SUSPENSION SYSTEM

[75] Inventors: J. Clark Fickle; Ralph August Gerhardt, both of Ottumwa, Iowa

[73] Assignee: Deere & Company, Moline, Ill.

[22] Filed: Nov. 15, 1973

[21] Appl. No.: 416,107

[52] U.S. Cl. .................................. 56/14.4, 56/17.2
[51] Int. Cl. ............................................ A01d 43/00
[58] Field of Search ..... 56/14.4, 14.5, 15.8, DIG. 1, 56/17.2, 1

[56] References Cited
UNITED STATES PATENTS
3,599,405  8/1971  Hurlburt ............................. 56/14.4
3,797,207  3/1974  Sawyer et al. ........................ 56/1

*Primary Examiner*—Antonio F. Guida
*Assistant Examiner*—J. N. Eskovitz

[57] ABSTRACT

A pull-type mower-conditioner has an L-shaped frame including a transverse beam and a pair of transversely spaced frame members extending upwardly and rearwardly from the beam adjacent the opposite ends of the beam. A harvesting header is disposed generally above and forwardly of the beam and is mounted on the main frame for vertical adjustment by means of a parallel link-type suspension system. A U-shaped support member has its central portion rotatably supported on the beam and a pair of rearwardly extending arms respectively journaling ground-engaging wheels adjacent the opposite ends of the beam. A remotely actuated hydraulic cylinder extends between a wheel arm and the top of the upright frame member at the left side of the machine and is actuatable to swing the support member and thereby raise and lower the main frame. A pair of telescoping members extend between the other wheel arm and the top of the other upright frame member and are selectively lockable together to lock the main frame in a raised position.

8 Claims, 2 Drawing Figures

FIG. I

HARVESTING MACHINE SUSPENSION SYSTEM

BACKGROUND OF THE INVENTION

This invention relates to a pull-type harvesting machine, known as a mower-conditioner, and more particularly to an improved suspension system for such a machine.

Conventionally, such harvesting machines have mobile main frames, with vertically adjustable headers supported on the main frame, means being provided for raising and lowering the header between transport and operating positions. While on many machines, the main frame has been maintained a predetermined distance above the ground, several recent machines have utilized a suspension system wherein the ground-engaging wheels are swingable relative to the main frame to raise and lower the main frame while the header is also being raised and lowered between the transport and operating positions of the machine. Two such machines are shown in U.S. Pat. Nos. 3,517,491, issued 30 June 1970 to Lausch et al., and 3,754,383, issued 28 August 1973 to Burrough et al. A third machine is shown in pending U.S. application Ser. No. 268,976, which is also assigned to the assignee herein, the present invention representing an improvement over the suspension system disclosed in said application. The machine in said application has separate wheel-supporting arms pivotally mounted to a transverse beam on the main frame, with separate hydraulic cylinders extending between the respective wheel arms for swinging the arms relative to the main frame and thereby raising and lowering the main frame.

SUMMARY OF THE INVENTION

According to the present invention, there is provided an improved wheel suspension system for such a mower-conditioner, wherein the main frame of the machine is raised and lowered to shift the machine between transport and operating conditions. More specifically, the suspension system utilizes a single lift cylinder to raise and lower the machine. Still more specifically, the wheels are mounted on the opposite ends of a U-shaped member, having its central portion extending transversely of the machine and journaled on the main frame, with the lift cylinder extending generally downwardly from an upright frame member on the main frame to one of the support member arms.

An important feature of the invention resides in the provision of a locking device between the other of the support member arms and a second upright frame member, the upper links of the header suspension system also being mounted on the upper ends of the upright frame members.

Another important feature of the invention resides in its simple and rugged construction, with reduced costs, the system eliminating one of the lift cylinders in the previously described system.

DESCRIPTION OF THE PREFERRED EMBODIMENT

Figure 1:
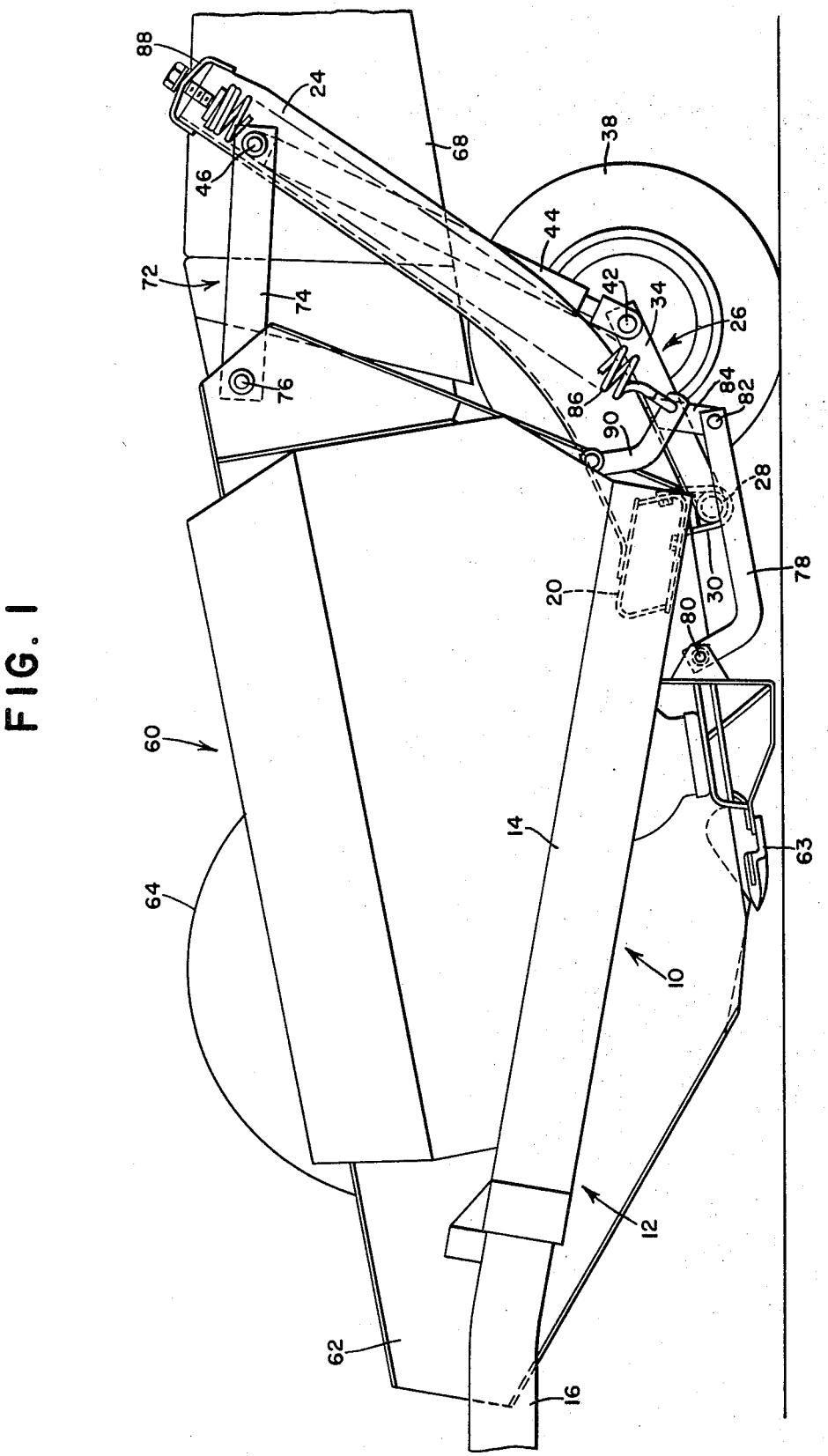
FIG. 1 is a side elevation view of a mower-conditioner embodying the invention, showing the machine in its lowered, operating condition.

The invention is embodied in a pull-type mower-conditioner having an L-shaped main frame 10 that includes a fore-and-aft draft portion 12 at the left side of the machine. The draft portion 12 includes a relatively flat, generally horizontal box member 14 at the rear of the draft portion and a fore-and-aft draft member 16 extending forwardly from the box member and connectible to a tractor, only the rearward end of the draft member 16 being illustrated in FIG. 1. The machine is powered by the tractor PTO through a drive system including a drive shaft (not shown) above the draft member in a known manner. The main frame also includes a transverse portion 18 which is chiefly formed by transverse beam 20 extending laterally from the rearward end of the box member 14. Right and left upright frame members 22 and 24 are respectively rigidly attached to and extend upwardly and rearwardly from the beam 20, the right frame member 22 extending upwardly from the right end of the beam 20 and the left frame member 24 extending upwardly from the left end of the beam 20 adjacent to the connection with the box member 14. As is apparent, the frame members are channel-shaped and are opened rearwardly.

A U-shaped support member 26 has a transverse, horizontal, central or bight portion 28 disposed adjacent to and substantially coextensive with the beam 20, the bight portion 28 being rotatably supported on the beam by means of a pair of strap-like, U-shaped brackets 30 that are attached to the beam and provide bearing surfaces that permit the support member 26 to swing about the transverse axis of the bight portion 28. The support member also includes right and left rearwardly extending wheel arms 32 and 34 at the opposite ends of the bight portion 28. Right and left ground-engaging wheels 36 and 38 respectively are rotatably mounted on the rearward ends of the wheel arms 32 and 34 by means of right and left transverse axles 40 and 42. Preferably, the U-shaped support member is formed from a single steel tube, the cylindrical shape of the bight portion permitting the support member to swing in the brackets 30.

Figure 2:
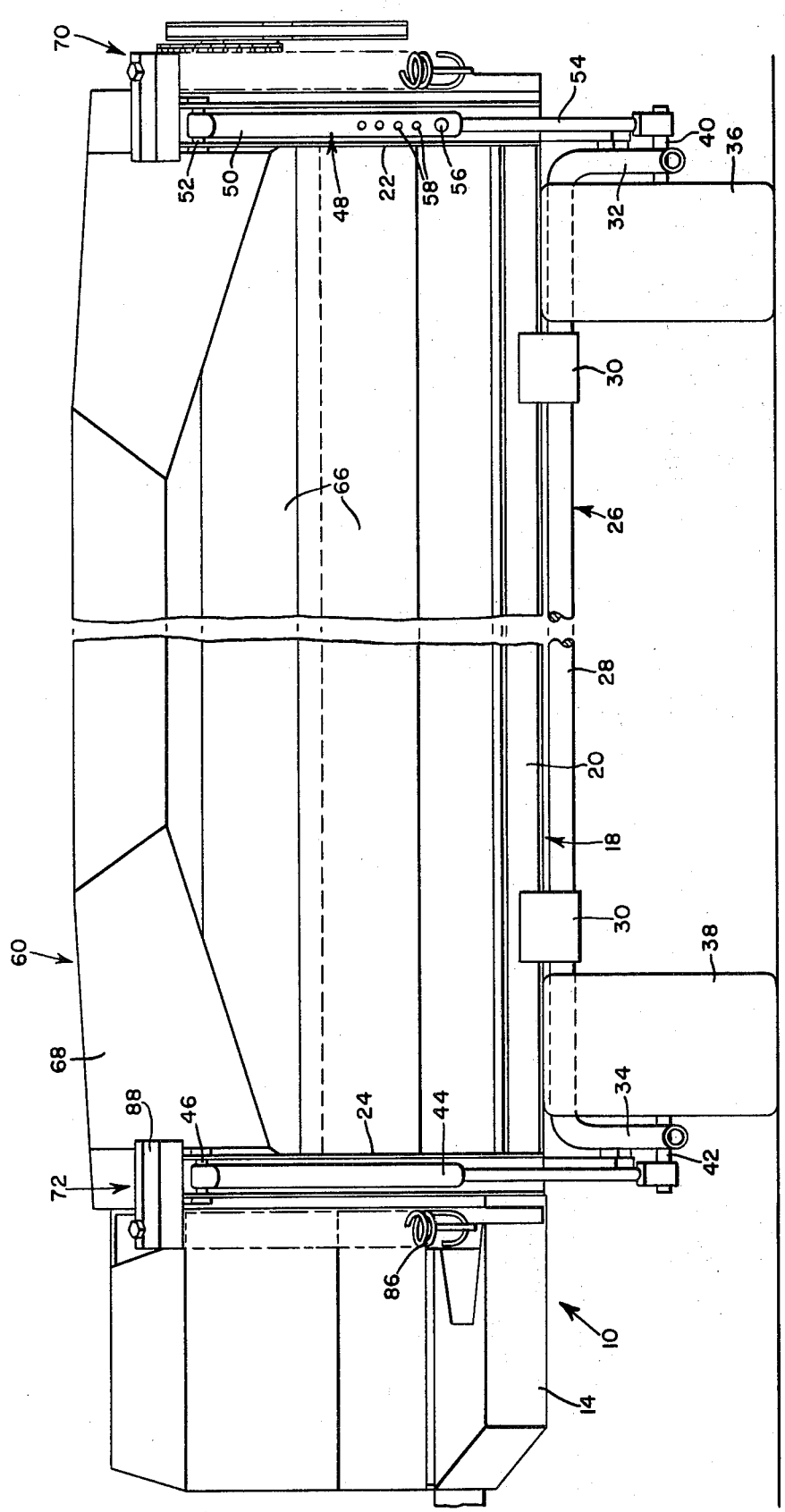
FIG. 2 is a rear elevation view of the machine in its raised, transport position.

A generally upright hydraulic cylinder 44 is disposed substantially within the channel-like left upright frame member 24 and has its upper or cylinder end pivotally connected to the frame member 24 by transverse pivot 46, the lower or piston end of the cylinder being connected to the left wheel axle 42. As is apparent, extension of the cylinder rocks the U-shaped support member 26 relative to the beam 20 to raise and lower the main frame 10, the frame being in its lower operating position as shown in FIG. 1 when the cylinder is retracted, and in its raised transport position as shown in FIG. 2, when the cylinder is extended. Pressurized fluid is supplied to and exhausted from the cylinder through conventional hydraulic lines (not shown) from the tractor and a control valve at the operator's station on the tractor.

A locking device, indicated generally by the numeral 48, is chiefly disposed within the right upright frame member 22 and includes a tubular upper member 50, having its upper end pivotally connected to the upper end of the frame member 24 by a transverse pivot 52, and a tubular lower member 54, that telescopes with the upper member 50 and has its lower end connected to the right axle 40. A pin 56 is selectively insertable through alternate holes 58 in the upper member and the lower member 54 to lock the members 50 and 54 against telescoping movement and thereby lock the support member 26 relative to the beam 20, so that the main frame can be selectively locked in a raised position for transport or the like.

The machine is provided with a forward header 60 having opposite side panels 62, only the left panel being shown in FIG. 1. As is well known, the header has a transverse cutter bar 63 extending between the opposite side panels and a reel 64, that also extends between the side panels above the cutter bar. The reel rotates to feed crop to the cutter bar, which severs the crop from the field, after which the reel feeds the crop to a pair of conditioner rolls 66, that condition the crop as it passes between the rolls and discharges it rearwardly, the rolls being shown in outline only in FIG. 2. As is also well known, the rearwardly discharged crop engages windrow-forming shields 68 at the rear of the machine, which converge the crop and deflect it downwardly into a windrow behind the machine.

The header 60 is suspended from the main frame by right and left parallel linkage-type suspension mechanisms 70 and 72, the suspension mechanisms being independent of one another and allowing independent vertical movement of the opposite ends of the header. The mechanisms 70 and 72 are substantially identical, and therefore only the left mechanism 72 will be described in detail. The mechanism 72 includes a fore-and-aft upper link 74 having its rearward end pivotally mounted on the pivot 46 and its forward end pivotally connected to the header by a transverse pivot 76. The mechanism also includes a fore-and-aft lower link 78 having its forward end connected to the header behind the cutter bar by a transverse pivot 80 and its rearward end connected by a transverse pivot 82 to a bracket 84 depending from the wheel arm 34. An upwardly and rearwardly inclined helical tension spring 86 has its upper end connected to a plate 88 on top of the frame member 24 and its lower end connected to a bell crank 90 on the header 60, the opposite end of the bell crank being connected to one of the conditioner rolls to bias the conditioner roll against the other roll. The spring 86 also exerts a lifting force on the header to partly counterbalance the weight of the header, the right suspension mechanism utilizing a similar spring to counterbalance the weight of the right end of the header and provide a biasing force on the right end of the conditioner roll.

As is apparent, as the cylinder 44 extends to raise the main frame 10, the swinging movement of the wheel arms is transmitted to the header by the lower links to cause the header to raise relative to the main frame, the raising and lowering of the header in conjunction with the raising and lowering of the main frame being described in greater detail in said copending U.S. Pat. application Ser. No. 268,976. As is also apparent, the suspension system and the system for raising and lowering the main frame are very simple, the use of only a single cylinder also providing a very economical lift system. The locking device 48 also provides a simple, inexpensive, and easy-to-operate device for locking the machine in its raised, transport position.

We claim:

1. In a pull-type harvesting machine having an L-shaped main frame including a generally fore-and-aft portion at one side of the machine, a transverse beam connected to and extending laterally from the rearward end of the fore-and-aft portion, and a pair of transversely spaced upright frame members respectively rigidly attached to and extending upwardly from the beam adjacent the opposite ends of the beam, and a harvesting header vertically adjustably suspended from the main frame generally forwardly of the transverse beam and alongside the fore-and-aft frame portion by a suspension mechanism, the combination therewith of an improved ground-engaging support system for supporting the main frame above the ground and comprising: a U-shaped support member including a transverse horizontal bight portion and a pair of wheel arms attached to and extending generally rearwardly from the opposite ends of the bight portion; bearing means rotatably mounting the bight portion on the transverse beam for rotation of the support member about a transverse axis; a pair of axially transverse ground-engaging wheels respectively journaled on the wheel arms rearwardly of the support member axis; and a single hydraulic cylinder means having one end operatively connected to one wheel arm and the other end operatively connected to the upper end of the adjacent upright member for swinging the support member relative to the main frame in response to actuation of the cylinder means.

2. The invention defined in claim 1 and including a locking means having one end connected to the other wheel arm and the other end connected to the upper end of the other upright member for selectively locking the wheel arm relative to the main frame and including first and second telescoping members and pin means selectively operative between the telescoping members to lock the members together.

3. The invention defined in claim 2 wherein the suspension mechanism includes a pair of upper links respectively connected to the upper end of the upright frame members by a pair of transverse pivot means, and the upper ends of the cylinder means and the locking means are respectively pivotally connected to the frame members by said pivot means.

4. The invention defined in claim 3 wherein the wheels are journaled on the wheel arms by means of transverse axles, and the lower end of the cylinder means is connected to the wheel arm by means of a wheel axle.

5. The invention defined in claim 4 wherein the support member is formed from a single tubular member, and the bearing means includes a pair of U-shaped brackets having opposite legs secured to the beam and rotatably supporting the tubular bight portion between the opposite legs.

6. The invention defined in claim 1 wherein the suspension mechanism includes a pair of upper links respectively connected to the upper end of the upright frame members by a pair of transverse pivot means, and the upper ends of the cylinder means and the locking means are respectively pivotally connected to the frame members by said pivot means.

7. The invention defined in claim 1 wherein the wheels are journaled on the wheel arms by means of transverse axles, and the lower end of the cylinder means is connected to the wheel arm by means of a wheel axle.

8. The invention defined in claim 1 wherein the support member is formed from a single tubular member, and the bearing means includes a pair of U-shaped brackets having opposite legs secured to the beam and rotatably supporting the tubular bight portion between the opposite legs.

* * * * *